Figure 1:
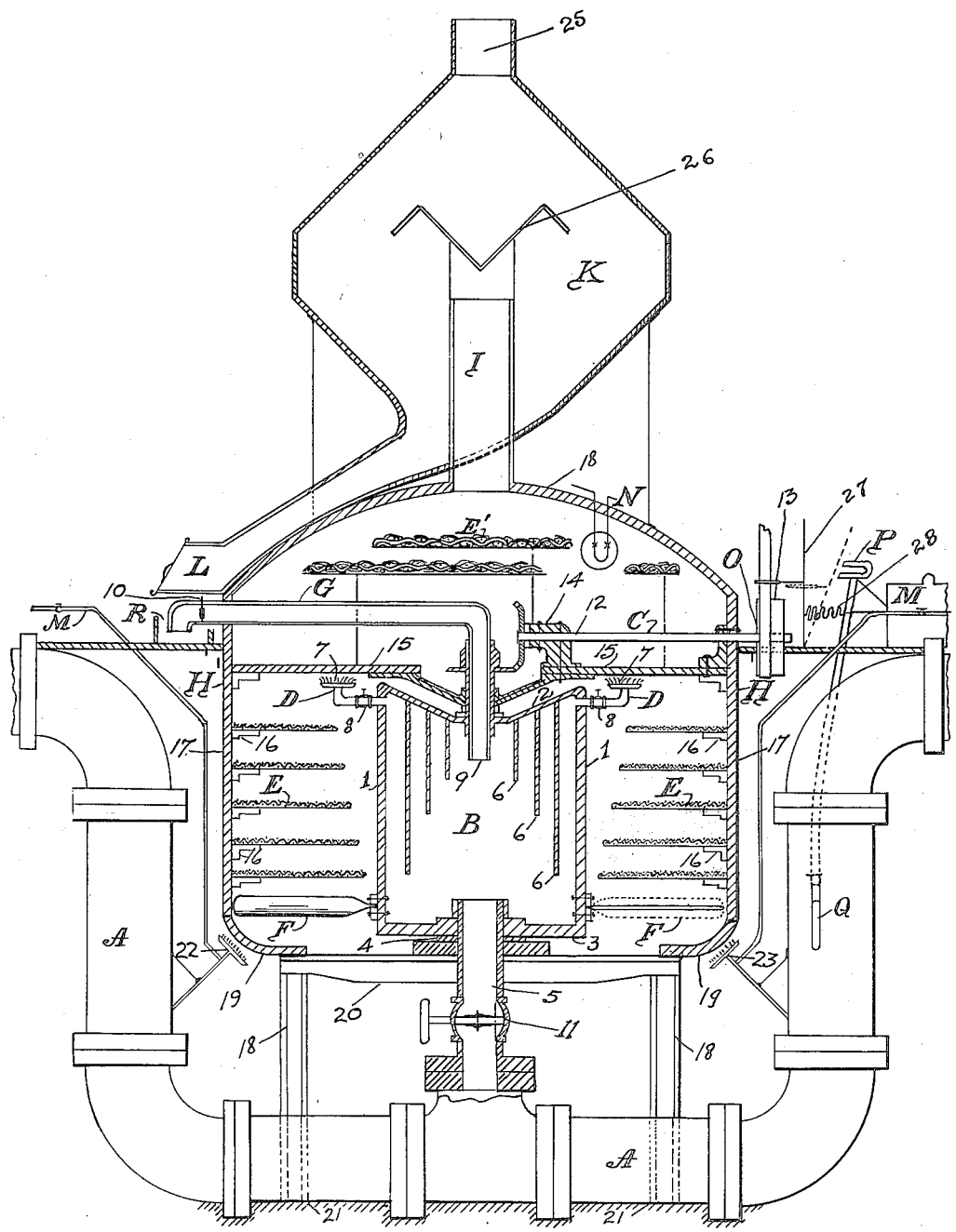

Patented Nov. 7, 1922.

1,434,520

UNITED STATES PATENT OFFICE.

JOHN P. BALL, OF CHICAGO, ILLINOIS.

SEWAGE PURIFIER.

Application filed April 21, 1921. Serial No. 463,219.

*To all whom it may concern:*

Be it known that I, JOHN P. BALL, a citizen of the United States, and resident of Chicago, in the county of Cook and State of Illinois, have invented a certain new and useful Improvement in Sewage Purifiers, construction of which the following is a specification.

This invention relates to devices for separating, atomizing, classifying, drying, treating or collecting, sewage sludge, trade wastes or the like by utilizing a fluid current, and aims to provide certain improvements therein.

Sewage sludge consists of the residue which remains after the treatment of city sewage by septic tanks, bar screens and mesh screens, by sedimentation or by chemical precipitation or by settling tanks and towers. The further treatment of sludge is effected by separating the solid material from the liquids so as to produce a commercial product of manurial value.

The process of purification by natural filtration whereby the sewage flows through sand or broken stone filters has been in public use for many years past. This process consists of a direct action of oxidization of organic matter due to the natural elements of agitation, air, heat and light, acting on the solid particles in the sewage as intercepted by the surface of the filter, and the natural chemical action of oxidation takes place. This process is called intermittent filtration, or intermittent sprinkling filters, A further object of my invention, therefore, is to subject the sewage to five distinct operations: first to collect the liquid sludge by means of sedimentation, second to reduce by mechanical means the liquid sludge to a coagulated constituency, third to subject the coagulated sludge to a treatment of bacterial or oxidizing action, and fourth to collect the oxidized sludge in a dry state.

Other objects of my invention are to provide means whereby sewage may be mechanically treated, filtered and separated, by utilizing a current of air and the application of heat and light in controllable quantities and degree of concentration.

My invention contemplates a sewage line which is constructed so as to provide a sump section, as at A, with which a revolvably mounted dewatering chamber, as at B, is adapted to be in communication at the bottom of the chamber and at the lowest point of the sump section, so as to permit the sewage to rise within the chamber to the normal level of the sewage in the main line; the chamber being in turn provided with revoluble mechanism C. whereby the untrapped sewage will be given a concentrical movement and the heavier particles that are held in suspension in the sewage will be thrown towards the outer most edge of the chamber; in conjunction with the chamber and revolving therewith, discharge means, as for example at D, whereby the so treated particles of sewage may be sprayed outwardly from said chamber and cast onto annular means as at E. E. and subjected to air drying means or fan F. F. which revolves in conjunction with said revoluble chamber; the invention also provides a fixed overflow exhaust pipe, as at G. whereby the so treated sewage effluent may be drawn from the revolving chamber and discharged into an open drain; at R. a suitable housing for the revolving chamber, driving mechanism and annular screens is provided by means of a casing as at H. which encloses the entire body of the machine; the invention also provides an air exhaust flue as at I.; in conjunction with means as for example at K. whereby the entrained particles of dried sludge may be collected and passed to a final dry product outlet as shown at L.

As thus far described the invention utilizes a mechanical separator and a mechanical filter, but my invention also provides means whereby the results of a natural intermittent filter may be attained. It is a well known fact that the bacterial action that takes place in the purification of sewage, depends upon the supply of both the aerobic bacteria those that live and work in light and air, and the anerobic bacteria those that live and work without light or air, the element of heat also supplies a propagating effect on the bacterial action. My invention provides means for a controlable supply of heat as at M. M. and also means for a supply of concentrated light as at N.

In order to obtain the results of bacterial action by light and heat, it is necessary that agitation may cease and the revoluble mechanism be at rest. My invention provides means whereby intermittent periods of motion and rest may be obtained by the fast and loose pulleys as at O. These intermittent periods of motion and rest are hereby classified for convenience as primary and secondary treatment in this process of sewage purification.

In the accompanying drawing, which shows a certain adaptation of my invention, Figure 1 is a vertical axial section showing the preferred form of my invention.

The sump section A constitutes a sinuous conduit in the main sewer and is constructed so as to collect the heavier particles held in suspension and acting as a sludge collecting basin in the flowing sewage line and when the sump is charged with sludge, the primary treatment may be begun and continued until the sludge is dissipated from the basin and the secondary treatment is then effective. This intermittent action of the effective parts is a feature of my invention and may be accomplishd by an automatic starter by use of a hydrometer indicating the density of the sludge contained in the settling basin or sump, and acting in conjunction with an electric battery and magnet operating the fast and loose pulleys of the driving mechanism, as for example at P.

The revoluble chamber B. has a cylindrical body 1 and pan shaped top 2, and a flat bottom 3, it is mounted on suitable bearings 4, the bottom of the chamber is connected with the sump section by a feed tube 5 so that the sludge is allowed free access to the interior of the chamber which is provided with a plurality of concentrically arranged partitions 6, secured to the upper end of the chamber and disposed downwardly to different depths. The upper part of the body of the chamber is provided with a plurality of discharge pipes D which are in turn provided with spray nozzles 7. These discharge pipes and nozzles are operative by means of spring balanced valves 8, which open automatically by the increased revolutions of the chamber. The top of the chamber is provided with an overflow tube which is in direct communication with the conduit at 9, and carrying the discharged liquid from the central part of the chamber while in motion. At the outermost end of the overflow tube, a controlling valve 10 is provided which limits the amount of effluent. The feed tube is also provided with a controlling supply valve 11.

The driving mechanism shown consists of a driving shaft 12 carrying fast and loose pulleys 13, and geared to the driving parts by bevel gears. This shaft is mounted in bearings 14, which is bolted to the frame 15, which frame is shown as crossing the machine and supporting the internal parts together with the casing H. and anchored to concrete footings outside of the said machine thereof.

The annular defecating screen E. consist preferably of a plurality of stationary annular screens constructed of wire mesh and supported in their superimposed position by brackets connected to the outer casing as at 16. The screens may be of graded mesh, the coarser ones being at the top of the casing as at E.; so that they catch the inspissated sludge as it is discharged through the spraying tubes 7 of the revoluble chamber B.

The housing casing H consists of a cylindrical body 17 and a semi-spherical dome 18, and an open bottom 19. This casing which encloses the machine and contains the annular screens for drying the sludge is supported by suitable I beam construction resting on a concrete base. This I beam as shown 18, 20 and 21 also supports the bearings for the revoluble chamber and its relative members.

The air fan F. consists of a plurality of fan shaped blades attached at one end to the chamber and revolves therewith. The air supplied to the fan is heated by gas torches as at 22 and 23 which are connected to gas reservoirs M. M.

The air current flowing inwardly to the casing through the fan F. swings upwardly through the annular screens E. and then flows eventually through the passage I by way of an opening in the dome of the casing to the center of the dust collecting chamber K. from whence it may continue to the final exhaust flue at 25. In reaching these passages it must traverse the sludge which is caught in the mesh of the screens and particles dry enough to be floated by it will be carried upward so that upon reaching the dust collecting chamber it becomes a dried-sludge-laden current.

The dried-sludge or dust collecting chamber K. is preferable an enlarged flue and is provided with a series of baffle cones 26, disposed above the chamber K. to intercept the particles of dust and direct them downward toward the dry product reservoir L.

In operation the sludge is collected from the flowing sewage in the sedimentation basin A. and is permitted to rise in the reduction chamber B. by means of the connecting tube 5. The dewatering chamber is revolved about the tube 5 as an axis and the heavier particles of sewage or the solids in the sludge is thrown towards the outer edges of the chamber and is discharged through the sprinkling nozzles D. D. and onto the screens E. E., where it is dried by action of the air current flowing inwardly through the casing H. by means of a fan F. By these means the screens become charged with precipitated sludge, and the lighter liquid is allowed to pass from the dewatering chamber by means of the overflow pipe G. This constitutes the primary treatment. When the screens have become charged with coagulated sludge of the primary treatment the agitation ceases and the sludge is allowed to oxidize in the casing; light, air and heat are applied to produce the bacterial action necessary for this purpose, and the secondary treatment is begun.

It will be understood that the revolving chamber will not discharge through the balance valves 8 until the machine has reached a required degree of speed or a number of revolutions per minute. This action will allow the fan to operate a period in which no discharge of sludge occurs, and during this period the air current produced by the fan will flow through the oxidized sludge and carry it in dust form to the dust collecting chamber K. Depending upon the quality of the sludge or trade wastes it may be desired to conduct an automatic intermittent action or it may be desired to run a continuous action of the machine. In the latter case the oxidizing element may be eliminated and the machine set to revolve continuously.

The wastes from corn canning products and other industrial wastes may be so treated, which will greatly prevent the pollution of streams by the separation of the solids from the effluent.

In the automatic intermittent action the machine may be placed in a sludge pocket A. where the solids have deposited from the flowing sewage by gravity. As has been already explained the density of the sludge acting on a hydrometer and a finely adjusted electrical mechanism and magnet, and I furnish such means by a hydrometer at Q and connecting current wires to a coil magnet at P. As the density of the sludge increases the liquid in the hydrometer raises to a point which produces a contact in the electric current wires, the coil at P. operative as a magnet. This magnet throws the switch 27 in position and carries with it the driving belt onto the driving pulley, and by this means gives movement to the revolving parts. By the reversed operation the density falling in the sludge basin the electric current ceases and the switch is thrown back by means of a spiral spring 28. This operation is repeated according to the density of the sludge in the basin.

What I claim is:—

1. In sewage purifiers, the combination of a sedimentation sump and a revolubly mounted dewatering chamber communicating with each other, a drying chamber containing a plurality of annular screens surrounding said dewatering chamber, a superimposed dust collecting chamber communicating with said drying chamber, means for supplying sewage to the sedimentation sump, means for discharging sludge from the dewatering chamber onto the drying screens, means for causing an air current to flow through said drying screens and means for collecting the dried sludge in its upward and outward path.

2. In sewage purifiers the combination of a sedimentation sump and a revoluble mounted dewatering chamber communicating with each other, a drying chamber containing a plurality of superimposed annular screens surrounding said dewatering chamber, a collecting chamber superimposed upon said drying chamber, means for supplying sewage to the sedimentation sump, means for supplying sewage to the dewatering chamber, means revolving said dewatering chamber, means for discharging a spray from said dewatering chamber onto the drying screens, means for causing a current of air to flow through said screens and means for collecting the so treated material.

3. In sewage purifiers, the combination of a sedimentation sump section of a sewer and a revoluble mounted closed chamber provided with a series of concentrically arranged partitions depending from the upper end of said chamber, the successive partitions being of increasing depth from the chamber center towards the sides thereof, an axial arranged conduit extending through the upper end of said chamber and arranged to deliver a spray of sewage to be treated concentrically onto a plurality of annular screens, means for drying the treated sludge, and means for collecting the dried material.

4. In sewage purifiers, comprising in combination a sludge sedimentation basin communicating with a revolubly mounted dewatering chamber having a sludge discharge conduit revolving therewith and a fixed effluent discharge pipe, a casing containing a plurality of mesh screens and surrounding said dewatering chamber, and a superposed dust collecting member, means for delivering sewage to the sedimentation basin, means for delivering the sludge to the dewatering chamber, means for treating the sludge concentrically, controllable means for discharging the treated sludge on to said screens, and means for collecting the dewatered sludge.

5. In sewage purifiers, the combination of a sludge sedimentation basin communicating with an upper revoluble sludge dewatering chamber, a casing containing a plurality of annular superimposed screens for drying the sludge, a superposed sludge collecting chamber, means for supplying sewage to the sedimentation basin, means for supplying sludge to the dewatering chamber, means for discharging the treated sludge onto the plurality of annular screens, means for creating a current of air throughout said screens and means for collecting the dried sludge.

6. In sewage purifiers the combination of a sludge sedimentation basin, a sludge dewatering chamber, a surrounding drying compartment and an elevated dust collector, all communicating with each other, means for causing a heated current of air to flow through the drying compartment, means for heating the air current and means for collecting the dried sludge.

7. In sewage purifiers, the combination of a sludge sedimentation basin, a revoluble dewatering chamber having a series of air blades surrounding the outer lower periphery and moving with said revoluble chamber, means for supplying sewage to the sedimentation basin, means for supplying sludge to the dewatering chamber, means for discharging the sludge, means for discharging the effluent and means for causing a heated current to flow through the treated sludge.

8. In sewage purifiers, a sludge-sprinkler and an annular screen, means for bacterially treating the sludge and means for discharging the sludge so treated.

9. In sewage purifiers, a lower sedimentation basin and an upper revoluable dewatering chamber, surrounding means for treating sludge by bacterial action, means for supplying heated air to the treated sludge and means for admitting light to the sludge so treated.

10. In sewage purifiers, a lower sedimentation basin and an upper revoluble dewatering chamber communicating therewith, said dewatering chamber being provided with a plurality of spray discharge tubes at the outer edge, said discharge tubes being provided with adjustable spring balanced valves which open and close with the relative speed of the revolving chamber, means for treating the sludge and means for drying the sludge, and means for collecting the dried sludge.

11. In sewage purifiers a sedimentation basin, a revolving dewatering chamber and dependent fixed blades surrounding it and fixed thereto, in combination with means for intermittently driving said part and means for starting and stopping said driving mechanism.

12. In sewage purifiers, a sedimentation basin, a revolving dewatering chamber in conjunction with revolving fixed blades surrounding the lower periphery thereof and a plurality of sludge discharge tubes surrounding the upper periphery thereof, controllable means for operating said fixed blades independently of said discharge tubes, a casing, means for causing an air current to flow upward therein, means for causing a sludge-laden current to traverse upward in an annular path, means comprising a plurality of spaced annular screens surrounding said path and providing an upper outlet for the precipitated sludge, and a sinuous current passage outside of said path for receiving said sludge-current successive to said path for extracting the dried particles carried by said current.

JOHN P. BALL.

Witnesses:
 GEO. M. BALL,
 E. M. BALL.